UNITED STATES PATENT OFFICE.

SAMUEL S. KAPPEL, OF WOODHULL, ILLINOIS.

IMPROVEMENT IN GATES.

Specification forming part of Letters Patent No. 59,405, dated November 6, 1866.

*To all whom it may concern:*

Be it known that I, S. S. KAPPEL, of Woodhull, in the county of Henry and State of Illinois, have invented a new and Improved Gate; and I do hereby declare that the following is a full, clear, and exact description thereof, reference being had to the accompanying drawings, forming part of this specification.

The object of this invention is to construct a gate for farms and railroads to obviate the necessity of getting out of the vehicle to open and close the gate.

It consists in making a frame of a rectangular form, of sufficient dimensions to be operated by the wheels of the carriage striking against a crank-shaft that connects with a vertical pitman, the upper end of which connects with a walking-beam or a horizontal pivoted lever that is connected to the gate by novel mechanism that throws the gate upon pivots m in a vertical direction.

To enable others skilled in the art to make and use my invention, I will proceed to describe its construction and operation.

Figure 1:
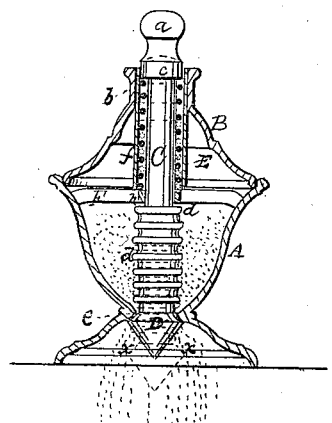
Figure 2:
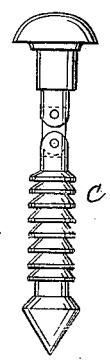

Figure 1 is a plan view of my improved gate. Fig. 2 is a longitudinal vertical sectional elevation of the same, taken through the line x x. Fig. 3 is a side elevation of the gate.

Letters of like name and kind refer to like parts in each of the figures.

A is a rectangular frame, of suitable dimensions, which is located in any place where it is designed to have a gate. This frame A is settled in the ground so that the top of the frame will come level with the surface. B and C are two posts erected at about the center of the frame A, the lower ends of which are firmly secured to the two side pieces of the said frame A. To the post B is pivoted the top bar, D, of the gate, which is provided with a counter-weight, E, upon the outside of the post B. Upon the under side of this bar D are pivoted pendants *a a* and *n*, (the pendant *n* being stationary,) which extend down, and to which are attached pivoted bars *e e e e e*, that run transversely in the pendent bars *a*, thus forming the gate.

Near the top of the post C is a catch, in which the latch *i* fits to hold the gate shut or closed.

To each of the end cross-pieces of the frame A are located crank-shafts F F, that have bearings in the said cross-pieces. This crank-shaft stands in such a position that the wheel of the vehicle will strike it, when it turns down and opens the gate. At the end of the said crank-shaft F is another crank, the wrist of which is connected to the lower end of a pitman, G, the upper end of which is connected to the walking-beam or pivoted lever H, the pivoted lever H being pivoted at *u* to the post L, which is framed firmly to the main frame A. The opposite end of the said pivoted lever H is connected to a looped rod, J, that extends down and connects with an elbow-lever, K, that is pivoted in the bar D. At the same point of the elbow where the looped rod J connects is also attached a rod or link, *m*, that also connects with a slide, L, that catches into the latch M for the purpose of holding the gate up for the team to pass.

N is a spring secured in a vertical position in the post B, for the purpose of giving the gate a start to be closed when the latch M is released from the slide L. S is a rod attached to the elbow-lever K, and extends in a groove in the under side of the bar B, where it connects with the latch *i*, for the purpose of disengaging the said latch from the catch in the post *c*, so the gate can be opened. P is a spring attached to the upright post I under the pivoted lever H, for the purpose of keeping it steady in its position.

The perfect operation of my improved gate is obvious, as when the wheel of a vehicle comes in contact with that portion of the crank-shaft F that is located upon the cross-timber of the frame A it is turned down toward the gate, the effect of which is the crank raises the pitman G, which also raises that end of the pivoted lever H to which it is connected, which causes the end of the said lever to press down the looped rod J that is connected to the elbow-lever K, that at the same time releases the latch *i* from the post *c*, while the continual downward movement of lever H causes the looped rod to press down the end of the bar D, which throws up the bars *e* in a vertical direction, so that the vehicle may pass through.

It will be observed that this arrangement is duplicated, one being located upon each side of the gate, so that the construction and oper- J. M. Keep,
Clothes Sprinkler,
No 59,406.  Patented Nov. 6 1866.

Witnesses
M Bailey
S A Duncan

Inventor.
J M Keep, by
A Pollok
his atty.